Dec. 28, 1948.  J. J. JONES  2,457,679
SLIDING FOCAL PLANE SHUTTER FOR CAMERAS
Filed June 3, 1947  2 Sheets-Sheet 1
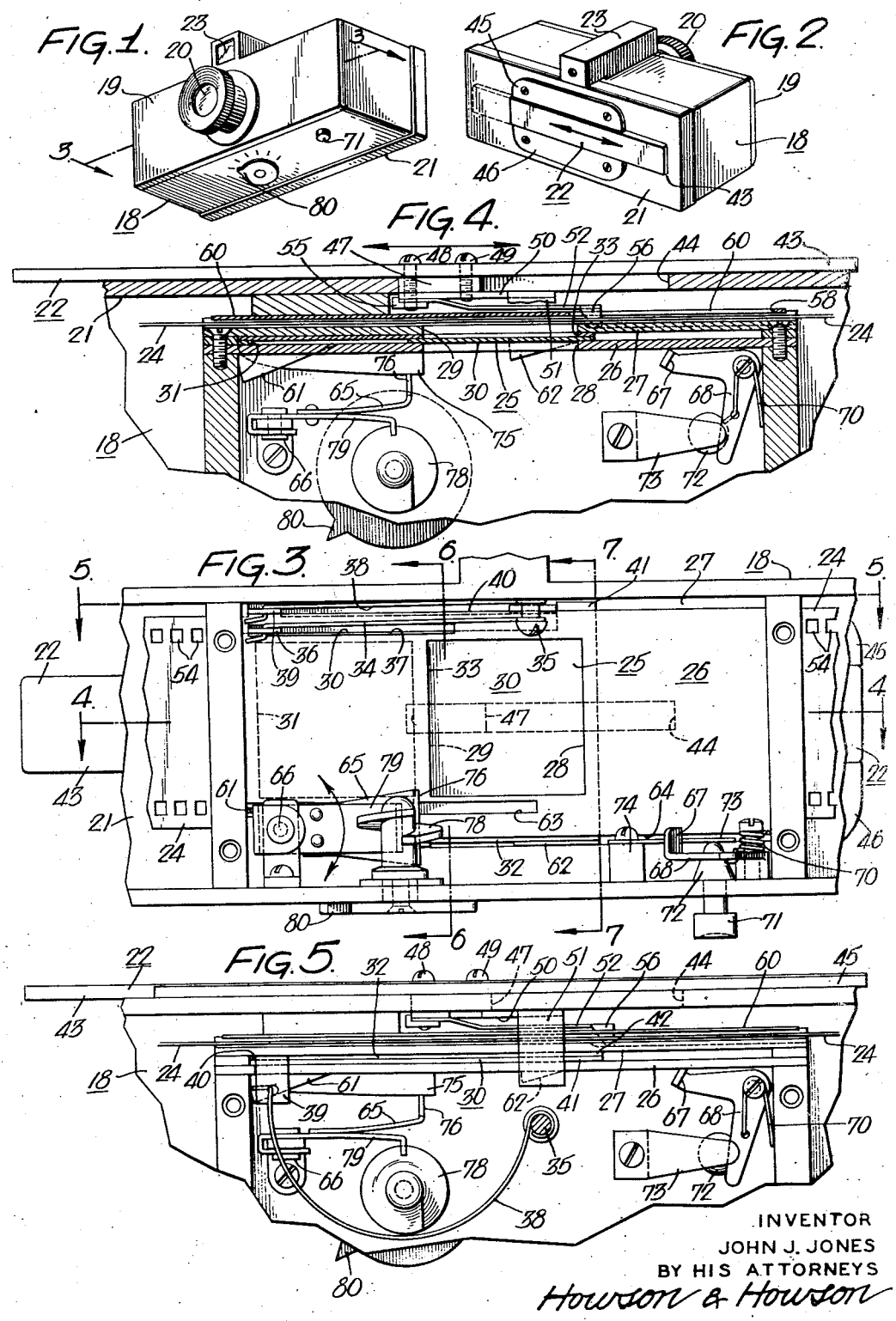
INVENTOR
JOHN J. JONES
BY HIS ATTORNEYS
Howson & Howson

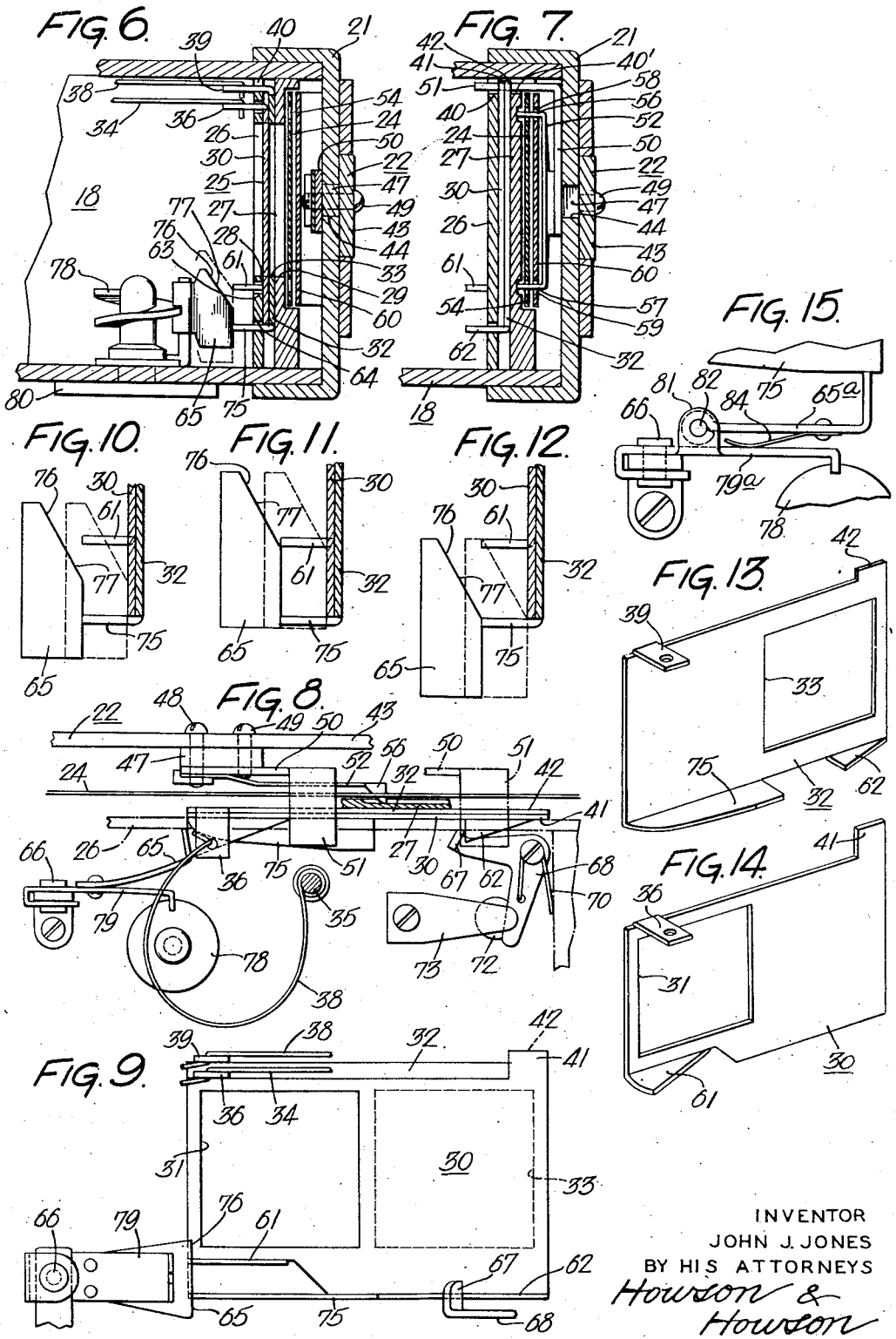

Patented Dec. 28, 1948

2,457,679

UNITED STATES PATENT OFFICE 2,457,679

SLIDING FOCAL PLANE SHUTTER FOR CAMERAS

John J. Jones, Collingdale, Pa.

Application June 3, 1947, Serial No. 752,148

5 Claims. (Cl. 95—55)

My invention relates to camera shutters, and more particularly focal plane shutters. The invention is especially useful in its application to cameras which take pictures of small size, to which use, however, it is not restricted.

One object of the invention is to provide a focal plane shutter wherein two separate leaves will coact, adjustably and with certainty, to give the desired exposure. A further object is to provide such a shutter in simple form and with a minimum number of parts. Other objects and advantages of the invention will be apparent from the present specification considered in connection with the accompanying drawings, in which—

Fig. 1 is a front perspective view of a well-known type of camera, in inverted position, to which the invention may be applied;

Fig. 2 is a rear perspective view of the same camera;

Fig. 3 is an enlarged cross-section taken on the vertical plane which contains the line 3—3 of Fig. 1 and viewed in the direction of the arrows;

Fig. 4 is a fragmental horizontal section taken on the line 4—4 of Fig. 3;

Fig. 5 is a fragmental horizontal section taken on the line 5—5 of Fig. 3;

Fig. 6 is a fragmental vertical section taken on the line 6—6 of Fig. 3 looking in the direction of the arrows;

Fig. 7 is a similar section taken on the line 7—7 of Fig. 3;

Fig. 8 is a fragmental plan view within the camera illustrating the parts shown in Fig. 5 with the shutter mechanism cocked and ready to make the exposure;

Fig. 9 is a front elevation of the two shutter leaves which form a part of the focal plane shutter in cocked position, together with parts of the latches which hold them;

Fig. 10 is an enlarged elevation, partly in vertical section, showing the adjustable latch which holds one of the shutter leaves in cocked position;

Fig. 11 is a similar view showing another adjustment of the latch illustrated in Fig. 10;

Fig. 12 is a similar view showing still another adjustment of the latch illustrated in Fig. 10;

Fig. 13 is a perspective view of one of the shutter leaves forming a part of the invention;

Fig. 14 is a perspective view of the other shutter leaf forming a part of the invention; and Fig. 15 is a fragmentary plan view illustrating a modification within the scope of the invention.

In the drawings there is shown a camera 18 having a front 19, which carries the lens 20, and a back 21 upon which is mounted a slide 22 for cocking the shutter mechanism. A finder 23 is provided on top of the camera 18. A film 24 is movable across the rear position of the camera, in front of the back 21 and immediately behind a focal plane shutter 25 which normally excludes from the film light entering the camera through the lens 20.

The focal plane shutter comprises a plate 26 which is disposed in front of the back 21 of the camera in a position parallel thereto, and a second plate 27, disposed between the back 21 and the first plate 26. The plate 26 has an opening 28 positioned substantially centrally thereof, through which the exposure is made; and the second plate 27 has an opening 29 therein which is in register with the opening 28 in the first plate. The openings 28 and 29 are normally closed by one of two shutter leaves: one when the shutter is not cocked, the other when the shutter is cocked. Thus a first shutter leaf 30 is slidably mounted between the plate 26 and the plate 27 and has an opening 31 therein which is registrable with the openings 28 and 29 in the plates 26 and 27. A second shutter leaf 32 of substantially like size is slidably mounted immediately behind the first shutter leaf 30 and has an opening 33 therein which is registrable with the openings in the first shutter leaf and in the plates. Accordingly it is possible so to slide the two shutter leaves behind the plate 26 as to close the opening 28 either by the shutter leaf 30 or by the shutter leaf 32.

When the focal plane shutter is not cocked, the two shutter leaves are positioned at the left of the plate 26, as viewed in Figs. 3 and 4, and the opening 28 in the plate is closed by the first shutter leaf 30, the opening 31 therein being out of register with the opening 28 in the plate 26. At the same time, the opening 33 in the second shutter leaf 32 is in register with the opening 28 in the plate.

Resilient means is provided for pressing each shutter leaf into the position just described. One such resilient means, therefore, will press the first shutter leaf 30 into shutter closing position, while the other such resilient means will press the second shutter leaf 32 into shutter opening position. As here shown, a spring 34, having one end fixed to a screw 35 in the top of the camera 18, is connected under compression to an extension 36 turned forwardly from the top of the leaf 30 at its left-hand end (as seen in Figs. 3, 9 and 14). The extension 36 projects from the leaf through a longitudinal slot 37 in the upper part of the plate 26. Thus, as viewed in Fig. 3, the spring 34 presses the shutter leaf 30 toward the left hand end of the plate 26. Similarly a spring 38, has one end fixed to the screw 35 and is connected under compression to an extension 39 turned forwardly from the top of the leaf 32 at its left-hand end (as viewed in Figs. 3, 9 and 13). The extension 39 projects from the leaf 32, above the top of the leaf 30, through a longitudinal cut-out 40 formed in the top of the plate 26. Accordingly, as viewed in Fig. 3, the spring 38 presses the shutter leaf 30 toward the left-hand end of the plate 26. With either shutter leaf moved from the position illustrated in Fig. 3, the connected spring will, therefore, tend to return it to that position.

The focal plane shutter is cocked by moving both shutter leaves together, against the action of the springs 34 and 38, to the opposite end of the plate 26 from that at which the leaves are normally held. This is accomplished by moving the slide 22 across the back of the camera. The slide 22 is moved to the right, as viewed in Fig. 5. A more detailed description of the shutter cocking mechanism will now be given.

The first shutter leaf 30 has a cocking projection 41 formed thereon. The cocking projection is preferably unitary with the shutter leaf, and extends upwardly from the end thereof opposite to that on which the extension 36 is formed. A similar cocking projection 42 extends upwardly from the corresponding end of the second shutter leaf 32. Both cocking projections are of sufficient length to reach into the longitudinal cut-out 40 at the top of the plate 26. Since the top of the second shutter leaf 32 is higher than the top of the first shutter leaf 30, the cocking projection 41 on the first shutter leaf extends a greater distance from the top of that leaf than does the corresponding part above the top of the shutter leaf 32, in order to reach into the cut-out 40. Furthermore, a cut-out 40¹, corresponding to the cut-out 40, is formed in the top of the second plate 27. Accordingly, an instrument, inserted through the longitudinal cut-outs at the tops of the plates 26 and 27, may engage the cocking projections 41 and 42 to move the shutter leaves 30 and 32 across the openings 28 and 29 in the plates against the action of the springs 34 and 38. As the two leaves are moved across the openings together, they retain their relative positions and the openings in the plate are not uncovered. Furthermore, the length of the longitudinal cut-outs 40 and 40¹ in the top of the plates is such that, when the cocking projections 41 and 42 reach their ends, the opening 31 in the first shutter leaf 30 will be in register with the openings 28 and 29 in the plates 26 and 27, while the opening 33 in the second shutter leaf 32 will be out of register with these openings on the side thereof toward which the leaves have been moved.

The slide 22 which is illustrated in the drawings comprises a bar 43, reciprocable longitudinally of the outside face of the camera back 23 over a longitudinal slot 44 therein which it completely covers in all positions. The bar 43 slides between guides 45 and 46, mounted on the outside of the camera back, which stiffen and protect it transversely. A spacer 47, having a slidable fit in the slot 44, is fastened to the inner face of the bar 43, as by bolts 48 and 49, and a stiff sheet 50 which is wider than the slot 44 is fastened by the bolts to the spacer inside of the camera. Thus, the bar 43 is firmly held in place against the camera back in two dimensions, but is free to reciprocate longitudinally of the camera back over a distance equal to the length of the slot 44.

A part of the sheet 50 is turned away from the camera back to form an arm 51 which extends through the longitudinal cut-outs at the tops of the plates 26 and 27 on the uncocked side of the cocking projections 41 and 42. Thus, when the bar 43 of the slide 24 is moved into shutter cocking position, the arm 51 will move the shutter leaves into like position. When the slide is returned to its original position the arm will not hold the shutter leaves in cocking position, but will permit them to return to uncocked position.

The slide 22 also advances the film 24 as it moves the shutter leaves into shutter-cocking position. To this end, a pair of flexible fingers 52 and 53, having their ends spaced by the distance between the rows of conventional marginal holes 54 provided adjacent the longitudinal edges of the film 26, are conveniently fastened to the slide 22. As here shown, a clamp 55 is tightened toward the stiff sheet 50 by the bolt 48, which is threaded therethrough, and the flexible flingers are held to the slide between the clamp and the sheet. Prongs 56 and 57 are formed on the outer ends of the flexible fingers 52 and 53 respectively and are turned toward the film to engage the marginal holes therein. The prongs have a substantially vertical forward edge, or one which is slightly inclined forwardly toward the film; and a rearward edge which is forwardly inclined toward the film. Thus, when the slide is actuated to move the shutter leaves into cocking position, the prongs 56 and 57 will enter marginal holes of the film and the film will be advanced a distance substantially equal to that by which the shutter leaves are moved. When the slide is returned to original position, the prongs will ride out of the marginal holes in the film, and the film will be left in advanced position for exposure.

It is here noted that the prongs 56 and 57 extend through longitudinally extending openings 58 and 59 in a false back 60 which is fastened to the back of the camera behind the rearmost position of the prongs. The forward part of the false back is not fastened. It is bowed toward the second plate 27 so that the film 24 passing between these two members will be prevented from buckling under the force exterted by the flexible fingers and the prongs upon it.

Novel means is provided for latching and tripping the shutter when the leaves have been moved into cocked position. For this purpose each shutter leaf has a part thereof turned out of its main plane, at or near its lower edge, to act as a catch for engagement with a separate latch within the camera. Thus, the first shutter leaf 30 has a wedge-shaped section thereof 61 turned forwardly beneath the extension 36 and above its lower edge to form a catch. The second shutter leaf 32 has a wedge-shaped section 62 turned forwardly at its lower edge beneath the cocking projection 42 to form a catch. When the focal plane shutter is assembled, the wedge-shaped section 61 of the first shutter leaf 30 extends forwardly into the camera through a longitudinal slot 63 in the lower part of the plate 26. The wedge-shaped section 62 of the second shutter leaf 32 extends forwardly beneath the first shutter leaf 30 and into the camera through an elongated longitudinal slot 64.

A spring latch 65, carried by a horizontal pivot 66 is positioned to ride along an edge of the wedge-shaped section 61 of the leaf 30 as the latter is moved toward cocked position, and to snap behind the wedge-shaped section and latch the leaf in shutter opening position when it reaches the cocked position. The second shutter leaf 32 is latched in cocked position by the end 67 of a bell crank lever 68 which is suitably pivoted, as by a bolt 69 screwed into the bottom of the camera. A hair-pin spring 70 biases the lever toward the plate 26. The wedge-shaped section 62 of the second shutter leaf 32 turns the bell crank lever, against the force of the hair-pin spring, out of its path until the leaf attains cocked position, when the end 67 of the lever snaps into place behind the wedge-shaped section and holds the shutter leaf in place.

A manual release is provided for tripping the latch holding the second shutter leaf 32; namely, the bell crank lever 68. As here shown, the manual release comprises a push button 71, operable from outside the bottom of the camera, and having a conical head 72 within the camera. The conical head is positioned to turn the bell crank lever against the force of the hair-pin spring 70 when the push button is operated. Thus the end 67 of the bell crank lever is disengaged from the wedge-shaped section 62 of the second shutter leaf 32. A leaf spring 73, carried on a stardard 74 bears upon the top of the conical head 72 to hold it normally in the extended inoperative position and to return it to said position after each actuation.

The spring latch 65 which holds the shutter leaf 30 in cocked position is released by the second shutter leaf 32. To this end, a cam 75 is suitably formed at the lower edge of the leaf and is turned forwardly into the plane of the wedge-shaped section 62 beneath the projection 39 on the leaf. The cam will therefore project through the elongated longitudinal slot 64. When the second shutter leaf is unlatched and is moved by the spring 38 toward uncocked position, the cam 75 will engage the spring latch 65 and will force it out of contact with the wedge-shaped section 61 on the first shutter leaf 30. The first shutter leaf will thereupon be moved into the uncocked position by the spring 34.

Operation of the shutter as so far described will be apparent. With the shutter in uncocked position, the shutter leaf 30 will close the openings 28 and 29, while the opening 33 in the second shutter leaf 32 will be in register with the openings 28 and 29. By moving the bar 43 to the right as viewed in Figs. 3, 4 and 5, the arm 51, coacting with the cocking projections 41 and 42, will move the shutter leaves into cocked position where the latches 65 and 68 will hold them. By the same movement of the bar 43, a new section of the film 24 will be moved behind the opening 29, in a manner which has already been described. With the shutter leaves in cocked position, the opening 31 in the first shutter leaf 30 is in register with the openings 28 and 29 in the plates 26 and 27 respectively, and the second shutter leaf 32 closes the openings 28 and 29.

Upon operating the push button 71 the conical head 72 is caused to turn the bell-crank lever 68 out of engagement with the wedge-shaped section of the leaf 32, thereby releasing the shutter leaf 32, which is pressed toward uncocked position by the spring 38. Since the shutter leaf 32 moves alone at this point, the opening 33 therein starts to register with the openings 28 and 29 in the plates 26 and 27 and exposure of the section of film behind the opening 29 begins. As the second shutter leaf 32 continues to move, the cam 75 thereon bears against the spring leaf 65 and pushes it out of engagement with the wedge-shaped section 61, whereby it holds the shutter leaf 30 in cocked position. Thereupon the spring 34 moves the first shutter leaf 30 toward uncocked position. Since the springs 34 and 38 are of substantially equal strength, the shutter leaf 30 will move at substantially the same rate of speed as the shutter leaf 32. Consequently, the two shutter leaves will pass across the openings 28 and 29 together with the openings 33 and 31 therein out of register to form a slot which passes across the openings 28 and 29.

Obviously, the wider the slot formed by the two shutter leaves the greater will be the exposure of the film behind the opening 29; and the narrower the slot the slighter will be the exposure of the film behind the opening 29. Clearly the size of the slot will depend upon the point at which movement of the first shutter leaf 30 is started with respect to movement of the second shutter leaf 32. Means is therefore provided for adjusting the timing of the cam action which disengages the spring latch 65 from the wedge-shaped section 61 whereby it latches the leaf 30 in cocked position.

Accordingly, the spring latch 65 is constructed as an adjustable latch. The latching edge 76 of the spring leaf 65 is beveled, as at 77, so that its vertical position will determine the extent of its engagement with the wedge-shaped section 61. See Figs. 10, 11 and 12. Thus where the position of the spring latch 65 is low, a small part of the wedge-shaped section will be engaged thereby and the latch will be tripped before it has ridden up very far upon the cam 75. See Fig. 12. Where, however, the spring latch 65 is elevated considerably the latch must ride well up on the cam before being disengaged from the wedge-shaped section 61. See Fig. 11. A medium adjustment of the spring latch 65 is illustrated in Fig. 10.

The adjusting means here illustrated comprises a helical screw 78 which is mounted inside of the camera in a position to engage an arm 79 of the spring latch 65 and to move the arm and the latch upwardly or downwardly about the horizontal pivot 66. Accordingly, the helical screw 78 may move the spring latch into (1) a medium adjustment as shown in Fig. 10, (2) a slow speed adjustment as shown in Fig. 11, or (3), a high-speed adjustment as shown in Fig. 12. The stem of the helical screw 78 passes through the bottom of the camera and is fixed to an indicator 80 on the outside of the camera bottom. By turning the indicator 80, the helical screw 78 is turned to adjust the vertical position of the spring latch 65. Graduations may be marked upon the camera bottom as indications of the position of the helical screw, the adjustment of the spring latch 65, and the width of the slot which crosses the openings 28 and 29 in making the exposure.

In the modification shown in Fig. 15, the arm 79 of the previously described embodiment has been replaced by an arm 79a having ears 81 in which is held a pin 82. The pin 82 forms a pivot for a substantially rigid arm 65a which replaces the spring leaf 65 of the earlier embodiment, the arm 65a being loaded by a light spring 84. The function of the elements remains unchanged.

From the foregoing it will be apparent that focal plane shutters constructed according to the invention are simple in construction and operation, requiring a minimum number of parts. By tripping the latch holding one of two shutter leaves directly by the other leaf a simple positive relationship between movements of the two leaves is assured. Furthermore, adjustment of the latch which holds one shutter leaf and which is operated directly by the other is simple and direct in action.

The form of the invention here described and illustrated in the accompanying drawings is set forth merely to indicate how the invention may be applied. Other forms, variations and embodiments of the invention, coming within the proper scope of the appended claims, will naturally suggest themselves to those skilled in the art.

I claim:

1. A focal plane shutter comprising complementary apertured leaves slidable together between retracted and advanced positions and relatively adjustable to vary the extent of registration of said apertures and, thereby, the effective width of the shutter aperture during said movement, manually releasable means for retaining one of the leaves in the retracted position, a tooth projecting from the second leaf, a retractable latch engageable with the tooth to hold the leaf in retracted position, a cam on the first leaf positioned for engagement with the latch as the said first leaf slides toward the advanced position and operative to retract the latch from the tooth and to thereby release the leaf for movement jointly with the first leaf toward the advanced position, means for adjusting the latch to engage more or less of the total effective height of the tooth and to thereby correspondingly vary the extent of the retractive movement of the latch required to retract it from the tooth, the travel of the last named leaf from the fully retracted position to the point of contact of the cam with the latch being constant irrespective of the adjusted position of the latch whereby the said adjustment of the latch determines the point in the travel of the first leaf from the retracted position at which release of the second leaf occurs.

2. A focal plane shutter according to claim 1 wherein the said adjustment of the latch is in a direction substantially at right angles to the retractive movement thereof.

3. A focal plane shutter according to claim 2 wherein the latch has a tooth-engaging edge portion inclined to the direction of the adjustment movement of the latch, and another edge portion substantially parallel to said direction of adjustment and arranged for engagement by the cam of the first leaf.

4. A focal plane shutter according to claim 3 wherein the said latch is resiliently urged toward an operative position with respect to the tooth and wherein further the said tooth is provided with a cam surface operative when the carrier leaf is retracted to displace the latch from the path of the tooth.

5. A focal plane shutter according to claim 1 wherein the latch adjusting means consists of a screw having a dial associated therewith to indicate the position of the latch.

JOHN J. JONES.

REFERENCES CITED

The following references are of record in the file of this patent:

UNITED STATES PATENTS

| Number | Name | Date |
| --- | --- | --- |
| 423,913 | Dossert | Mar. 25, 1890 |
| 2,238,501 | Mihalyi | Apr. 15, 1941 |

FOREIGN PATENTS

| Number | Country | Date |
| --- | --- | --- |
| 594,651 | France (Keyzlar) | June 29, 1925 |